United States Patent
Park et al.

(10) Patent No.: US 7,389,521 B2
(45) Date of Patent: Jun. 17, 2008

(54) DISK CARTRIDGE

(75) Inventors: Dae-kyong Park, Seongnam-si (KR);
Han-kook Choi, Suwon-si (KR);
Dong-seob Jang, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 726 days.

(21) Appl. No.: 10/880,610

(22) Filed: Jul. 1, 2004

(65) Prior Publication Data

US 2005/0028187 A1 Feb. 3, 2005

(30) Foreign Application Priority Data

Jul. 8, 2003 (KR) .................... 10-2003-0046120

(51) Int. Cl.
*G11B 23/03* (2006.01)

(52) U.S. Cl. .................................... 720/740

(58) Field of Classification Search .................... None
See application file for complete search history.

(56) References Cited

U.S. PATENT DOCUMENTS 5,048,008 A * 9/1991 Haruna ..................... 720/738
5,406,547 A   4/1995 Akiyama et al.
5,963,537 A * 10/1999 Fujisawa ..................... 720/744
6,871,354 B2 * 3/2005 Tajima et al. ............... 720/738
6,948,181 B2 * 9/2005 Kang et al. .................. 720/738

FOREIGN PATENT DOCUMENTS

| JP | 2001-155461 | 6/2001 |
| JP | 2001-160275 | 6/2001 |
| JP | 2002-74886 | 3/2002 |
| JP | 2003-7025 | 1/2003 |
| JP | 2003-85922 | 3/2003 |

* cited by examiner

*Primary Examiner*—A. J. Heinz
*Assistant Examiner*—Mark Blouin
(74) *Attorney, Agent, or Firm*—Stein, McEwen & Bui, LLP

(57) ABSTRACT

A disk cartridge including a lower case member in which a space portion to receive an optical disk is formed; an upper case member, joined to the lower case member, an opening portion to allow a reading/recording device to obtain access to the optical disk; a multi-shutter member, including shutters, installed at the lower case member to be able to slide, and to allow the opening portion to be exposed to the outside when the multiple-shutter member is moved in a direction of the insertion direction of the disk cartridge into a disk drive, such that the shutters overlap each other; and a locking member, installed at the lower case member, to fix the multiple-shutter member to the lower case member so that the multiple-shutter member cannot move arbitrarily.

23 Claims, 8 Drawing Sheets

DISK CARTRIDGE

CROSS-REFERENCE TO RELATED APPLICATIONS

This application claims the benefit of Korean Application No. 2003-46120, filed Jul. 8, 2003, in the Korean Intellectual Property Office, the disclosure of which is incorporated herein by reference.

BACKGROUND OF THE INVENTION

1. Field of the Invention

The present invention relates to a disk cartridge for accommodating an optical disk that is an information recording/reproducing medium.

2. Description of the Related Art

In general, a disk cartridge is intended to accommodate an optical disk that is an information recording/reproducing medium, and is to be loaded in a disk drive. An example of a conventional disk cartridge is shown in FIG. 1.

Referring to FIG. 1, in a disk cartridge 101, an upper case 111 and a lower case 112 are assembled into a main body 106. An optical disk 105 which is an information recording/reproducing medium is accommodated in an inner space formed by assembling the upper case 111 and the lower case 112. An opening portion 115 and an opening hole 117 are formed at the main body 106 to expose the optical disk 105 to the outside. The opening portion 115 is a space through which a reading/recording device (not shown) obtains access to the optical disk 105, and the opening hole 117 is a portion into which a spindle motor (not shown) to rotate the optical disk 105 is inserted when the disk cartridge 101 is inserted into a disk drive (not shown).

A shutter 120 is installed at the main body 106 to be able to slide so that the opening portion 115 and the opening hole 117 can be exposed to or hidden from the outside.

When the disk cartridge 101 is inserted into the disk drive, the shutter 120 is slid in a direction perpendicular to the insertion direction of the disk cartridge 101 and is opened, and the opening portion 115 and the opening hole 117 are opened. After the disk cartridge 101 is completely inserted into the disk drive, the spindle motor obtains access to the opening hole 117, and the optical disk 105 is seated on the spindle motor. In addition, the reading/recording device obtains access to the opening portion 115, and while moving in a radial direction of the optical disk 105, the reading/recording device records information onto the optical disk 105, or reads information recorded on the optical disk 105.

The reading/recording device which records information onto the optical disk, or reads information recorded on the optical disk may be an slider carriage type one or a swing arm type one.

Since, in the slider carriage type device, the optical pickup performs recording/reading of information while moving linearly in a radial direction of the optical disk, the opening hole may have a narrow width, but must have a sufficient length in the radial direction so that the optical pickup may obtain access to the optical disk and may move linearly.

On the other hand, since, in the swing arm type device, a swing arm obtains access to the optical disk and performs recording/reading of information while pivoting on a predetermined pivot along an arc, the opening hole must be formed so that the swing arm can obtain access to the optical disk not only in a radial direction but also in a width direction.

That is, the opening hole of the swing arm type device must be formed to have an area greater than that of the opening hole of the slider carriage type device.

In recent years, while apparatuses and devices have become diverse as various technologies are developed, compatibility of one device with various apparatuses becomes important. Therefore, an optical disk needs compatibility so that the optical disk may be reproduced using various optical pickups.

However, since the conventional disk cartridge shown in FIG. 1 is configured so that only the slider carriage type optical pickup may obtain access to the optical disk to perform reproducing/recording of information, there is a problem in which the swing arm type optical pickup cannot perform reproducing/recording of information from/onto the optical disk, and therefore the disk cartridge is not compatible with the swing arm type optical pickup.

SUMMARY OF THE INVENTION

Therefore, the present invention provides a disk cartridge which is compatible with not only a slider carriage type optical pickup but also a swing arm type optical pickup so that both the slider carriage type optical pickup and the swing arm type optical pick may reproduce information from an optical disk, and/or record information onto the optical disk.

Accordingly, a disk cartridge comprises: a lower case member at which a space portion to receive an optical disk of an information recording medium is formed; an upper case member installed to join with the lower case member, having an opening portion to allow a reading/recording device to obtain access to the optical disk; a multi-shutter member which is installed at the lower case member to be able to slide, and to allow the opening portion to be exposed to the outside when the multiple-shutter member is moved in a direction of the insertion direction of the disk cartridge into a disk drive, such that shutters thereof overlap each other; and a locking member, installed at the lower case member to be able to slide, to fix the multiple-shutter member to the lower case member so that the multiple-shutter member cannot move arbitrarily.

In addition, to achieve the above object, there is provided a disk cartridge comprising: a lower case member at which a space portion for receiving an optical disk of an information recording medium, and an opening portion for allowing a reading/recording device to obtain access to the optical disk are formed; an upper case member installed to joined to the lower case member and provided with an opening portion for allowing a reading/recording device to obtain access to the optical disk; a multi-shutter member which is slidably installed to surround the upper case member and the lower case member, and allows the opening portion to be exposed to the outside when the multiple-shutter member is moved in a direction of the insertion direction of the disk cartridge into a disk drive, and therefore shutters thereof overlap each other; and a locking member installed at the lower case member to be able to slide and intended to fix the multiple-shutter member to the lower case member so that the multiple-shutter member cannot move arbitrarily.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
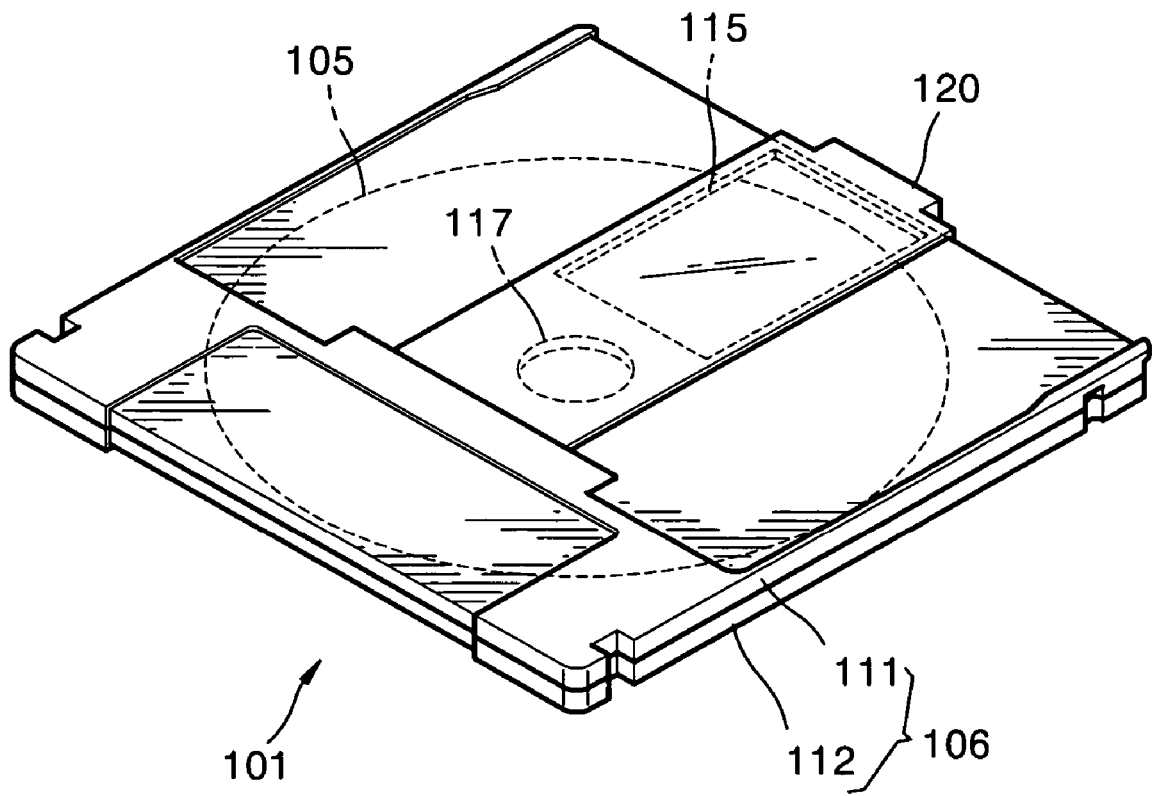
FIG. 1 is a perspective view illustrating an example of a conventional disk cartridge.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
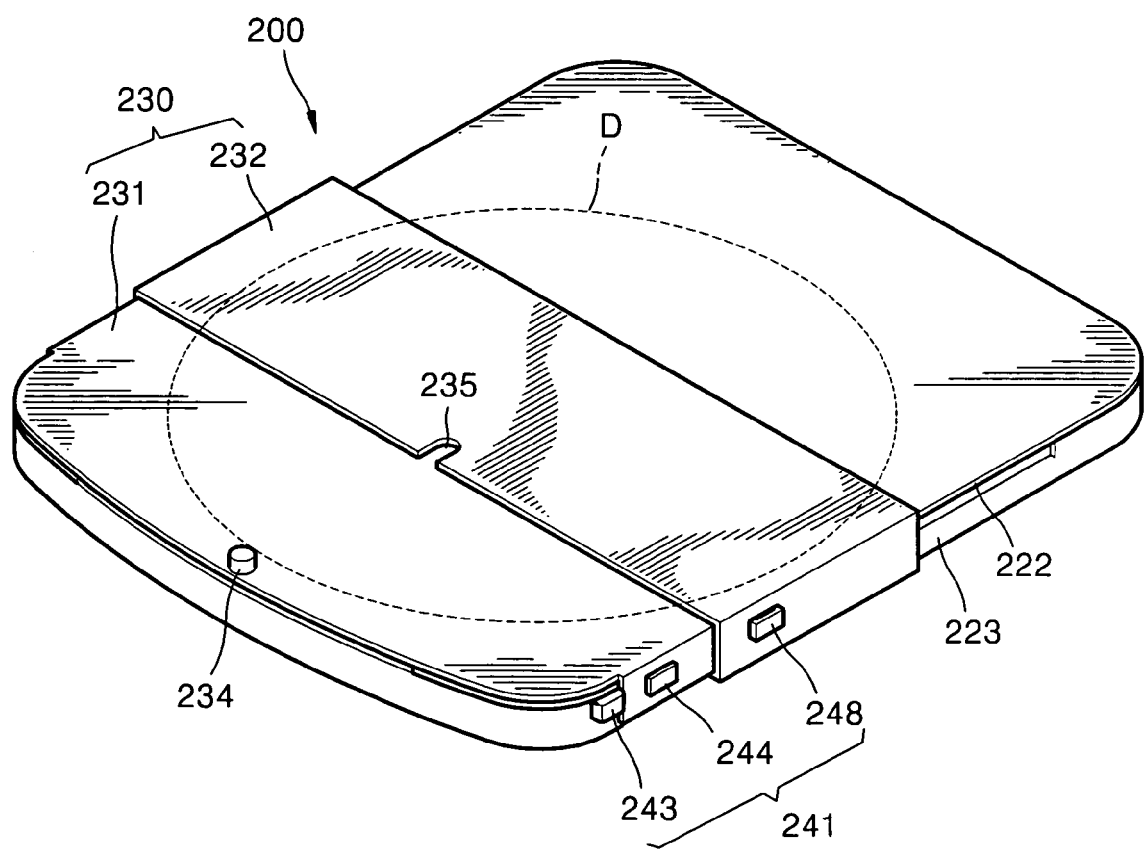
FIG. 2 is a perspective view illustrating a disk cartridge according to a first preferred embodiment of the present invention.
Figure 3:
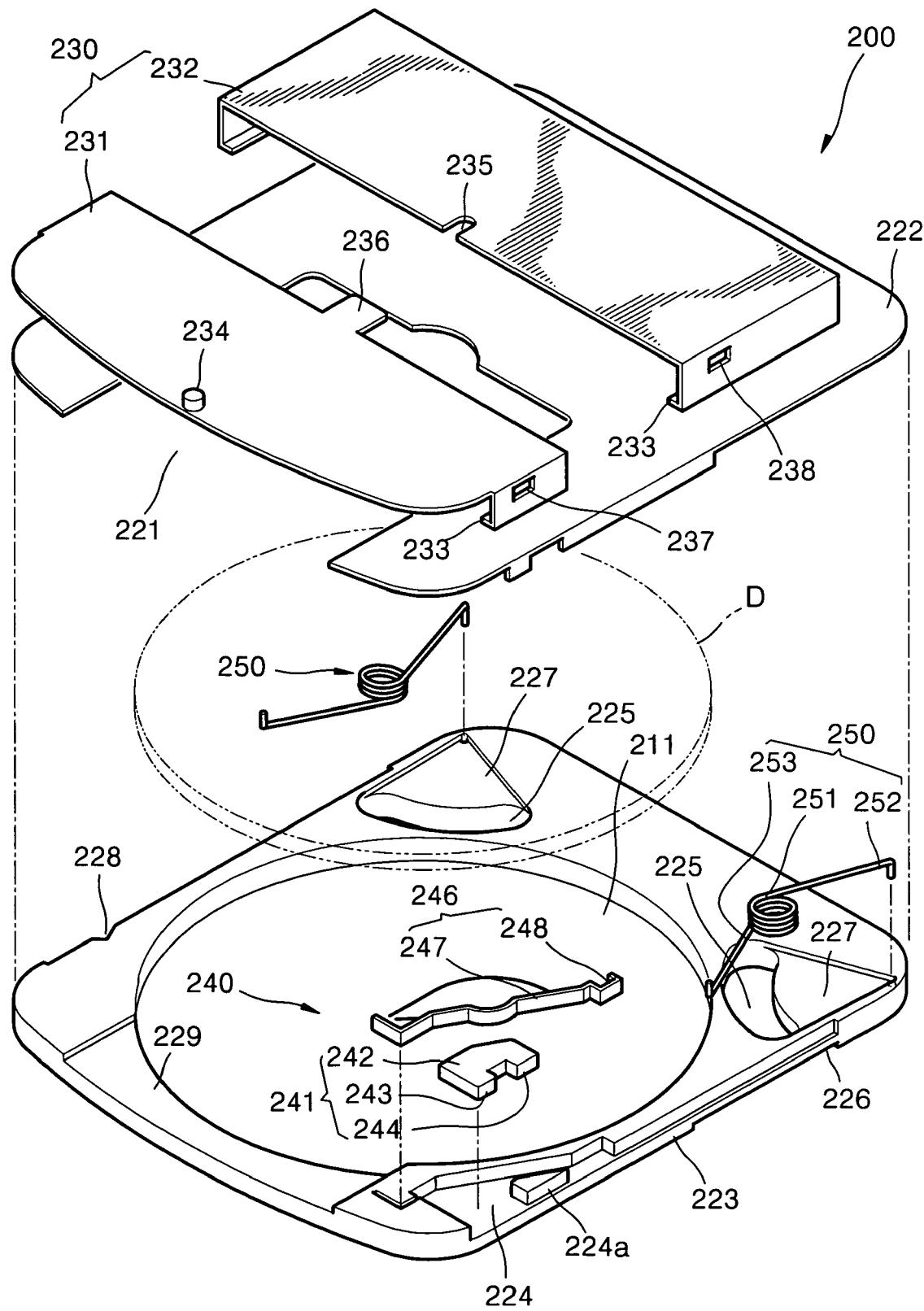
FIG. 3 is an exploded perspective view illustrating the disk cartridge shown in FIG. 2.

Referring to FIGS. 2 and 3, a disk cartridge 200 is comprised of an upper case member 222, a lower case member 223, a multiple-shutter member 230, a locking member 240, and elastic members 250.

A space portion 211 to receive an optical disk D of an information recording medium is formed at the middle portion of the lower case member 223, and a locker cavity 224 to install the locking member 240 is formed at one side of the lower case member 223. An access portion 229 which is formed to be a depression is provided at the front portion of the lower case member 223, that is, a side portion of the disk cartridge 200 which is a leading edge when the disk cartridge 200 is inserted into a disk drive so that a reading/recording device (not shown) may obtain access to the optical disk D.

A plurality of guide grooves 225 to guide the respective elastic members 250 so that the elastic members 250 may slide when the disk cartridge 200 is inserted into or discharged from the disk drive are formed at the rear portion of the lower case member 223. The guide grooves 225 will be described later together with the elastic members 250.

The upper case member 222 is joined to the lower case member 223 so as to envelop the optical disk D, and an opening portion 221 is formed at the upper case member 222 so that the reading/recording device may obtain access to the optical disk D.

Since the optical disk D stores information on only one surface thereof, and the reading/recording device does not have to obtain access to the optical disk D through the lower case member 223, a separate opening portion is not formed at the lower case member 223. Further, the upper case member 222 is installed at the lower case member 223 to be able to slide.

The opening portion 221 is formed to be wide so that both a spindle motor (not shown) to rotate the optical disk D and the reading/recording device for reading information stored in the optical disk D or to store information in the optical disk D obtain access to the optical disk D.

The multiple-shutter member 230 is slidably installed at the lower case member 223 so as to selectively open and close the opening portion 221. Guide rail portions 226 which guide the multiple-shutter member 230 and allow the multiple-shutter member 230 to slide are formed at both sides of the lower case member, respectively, and guide ribs 233 corresponding to the guide rail portions 226 are formed at both sides of the multiple-shutter member 230 so as to slide along the guide rail portions 226. Since the guide ribs 233 slide while surrounding the guide rail portion 226, the multiple-shutter member 230 slides on the lower case member 223.

In addition, the multiple-shutter member 230 is composed of at least two shutters which may overlap each other. When the shutters are referred to as a first shutter 231 and a second shutter 232 in sequence from a shutter installed at the front portion of the disk cartridge 200, that is, a side portion of the disk cartridge 200 which is a leading edge when the disk cartridge 200 is inserted into the disk drive, the multiple-shutter member 230 is configured so that the first shutter 231 may be inserted into the second shutter 232 and can overlap the second shutter 232. Therefore, in an embodiment of the invention, the width of the first shutter 231 is smaller than that of the second shutter 232. As a matter of course, the multiple-shutter member 230 may be configured so that the second shutter 232 may be inserted into and overlap the first shutter 231.

A projection 234 to restrain movement of the first shutter 231 is provided at the upper surface of the first shutter 231. When the disk cartridge 200 is inserted into the disk drive, the projection 234 permits the first shutter 231 to move such that the opening portion 221 is exposed to the outside.

An insertion slot 235 which corresponds to the projection 234 and into which the projection 234 is inserted is formed at the second shutter 232 so that the first shutter 231 may have a more overlapped area with the second shutter 232. When the first shutter 231 overlaps the second shutter 232, the projection 234 is inserted into the insertion slot 235.

In addition, a shielding portion 236 is provided at the rear portion of the first shutter 231, that is, a side facing the second shutter 232 so as to cover the insertion slot 235 and shield the optical disk D from foreign materials such as dust when the disk cartridge 200 is discharged from the disk drive.

The projection 234, the shielding portion 236, and the insertion slot 235 are positioned in a straight line relative to one another, but their positions in the first shutter 231 and the second shutter 232 may be determined arbitrarily.

The locking member 240 is intended to lock the multiple-shutter member 230 so as to prevent the multiple-shutter member 230 from sliding arbitrarily. When the multiple-shutter member 230 is not locked, the multiple-shutter member 230 is arbitrarily opened by an external force, the opening portion 221 is exposed to the outside, and foreign materials such as dust may enter onto the optical disk D and the information recording surface of the optical disk D may be damaged.

The locking member 240 is comprised of a locker 241 and a leaf spring 246. The locker cavity 224 is formed at one side of the lower case member 223 to be a depression so that the locking member 240 may be installed therein.

The locker 241 is able to slide while being guided by a locker movement guide portion 224a provided at the locker cavity 224, and is comprised of a push portion 243 and a first shutter engagement portion 244 which are formed at a predetermined distance from each other to project from a main body 242.

The push portion 243 is a portion which selectively comes in contact with a locking releasing portion 300 (refer to FIG. 4) installed at the disk drive. The first shutter engagement portion 244 is inserted into and locked in a first locking slot 237 formed at a side of the first shutter 231.

The leaf spring 246 is installed so that the locker 241 and the main body 247 of the leaf spring 246 contact with each other. One end of the leaf spring 246 is fixedly installed at the lower case member 223, and a second shutter engagement portion 248, which is inserted into and is locked in a second locking slot 238 formed at a side of the second shutter 232, is provided at the other end of the leaf spring 246. The leaf spring 246 is an elastic body in itself, and pushes the locker 241 toward the outside of the locker cavity 224. In this first embodiment, the leaf spring 246 is formed so that the contact portion of the leaf spring 246 with the locker 241 has a convex shape. However, the contact portion does not necessarily have a convex shape. The shape of the leaf spring 246 may have any shape such that the leaf spring 246 operates similarly.

Therefore, when the disk cartridge 200 is not inserted into the disk drive, that is, when the first and second shutters 231 and 232 are closed, the first engagement portion 244 of the locker 241 and the second engagement portion 248 of the leaf spring 246 are inserted into and are locked in the first locking slot 237 and the second locking slot 238, respectively.

When the disk cartridge 200 is discharged from the disk drive, the elastic members 250 pushes the second shutter 232 toward the direction of discharging the disk cartridge 200 and restores the second shutter 232 to its original position.

Each of the elastic members 250 is comprised of a body 251 formed by winding wire into a coil shape, a first lead 252 and a second lead 253 which are extended from the body 251. The body 251 is installed in the guide groove 225, the first lead 252 is supported by the lower case member 223, and the second lead 253 is supported by the guide rib 233 of the second shutter 232.

Therefore, when the disk cartridge 200 is inserted into the disk drive, since the elastic members 250 are compressed by the second shutter 232 while the second shutter 232 is slid, the bodies 251 are slid along the respective guide grooves 225.

In addition, at the lower case member 223 by which the first lead 252 are supported, movement guide portions 227 are formed as sector-shaped depressions in the vicinity of the respective guide grooves 225 so that when the elastic members 250 are compressed by the second shutter 232, the first leads 252 may pivot smoothly on the respective bodies 251.

The leading edge side of the disk cartridge 200 has a rounded shape. Compared with a straight shape, the rounded shape makes it possible to spare unnecessary space and to efficiently dispose parts and components.

Position fixing grooves 228, which allow the disk cartridge 200 to be stably fixed in place in the disk drive when the disk cartridge 200 is inserted in the disk drive, are formed at both sides of the lower case member 223. Position fixing projections (not shown) of a position fixing device, installed at the disk drive, are inserted into the position fixing grooves 228, and stably fix the disk cartridge 200 to the disk drive. The position fixing device, including an elastic member (not shown), is elastically biased when the disk cartridge 200 is inserted into the disk drive, and pushes the disk cartridge 200 out of the disk drive when the disk cartridge 200 is discharged from the disk drive.

The operation of the disk cartridge 200 configured as described above according to the first embodiment of the present invention will be described with reference to the relevant drawings.

As shown in FIG. 2, in the disk cartridge 200 according to the first embodiment, since the first and second shutters 231 and 232 cover the opening portion 221, the optical disk D is shielded from the outside, and foreign materials such as dust are prevented from entering onto the optical disk D. At this time, since the first shutter engagement portion 244 and the second shutter engagement portion 248 are inserted into the first locking slot 237 and the second locking slot 238, respectively, the first shutter 231 and the second shutter 232 are restrained from being arbitrary moved by external forces.

Figure 4:
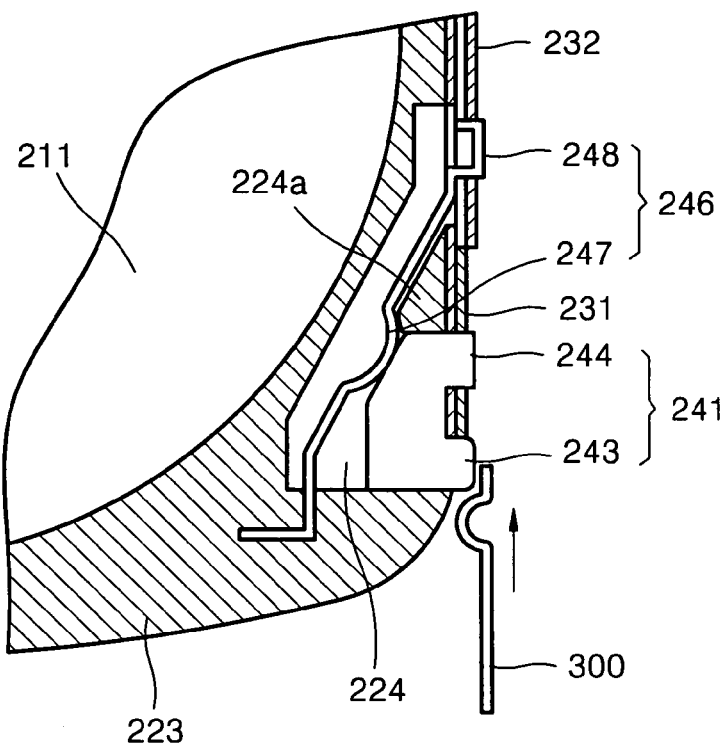
FIGS. 4 and 5 are cut-away plan views of a portion of the disk cartridge for describing the operation of a locking member shown in FIG. 2.
Figure 5:
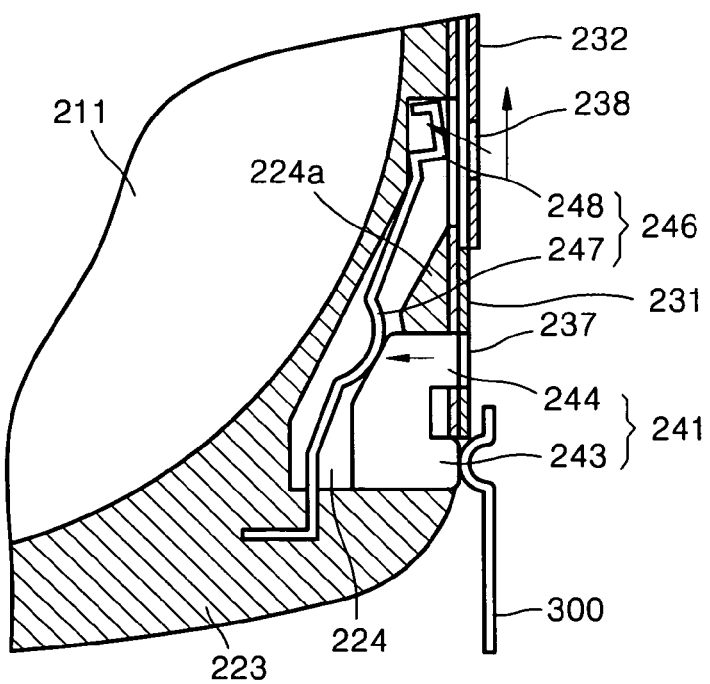

Referring to FIGS. 4 and 5, when a user inserts the disk cartridge 200 into the disk drive, the locking releasing portion 300 installed in the disk drive comes in contact with the push portion 243 of the locker 241, and, therefore, as shown in FIG. 5, the locker 241 is slid by the locking releasing portion 300 in the direction of an arrow while being guided along the locker movement guide portion 224a. Then, since the first shutter engagement portion 244 separates from the first locking slot 237, the first shutter 231 is freed from the restraint of the first locking slot 237.

Meanwhile, as the locker 241 is slid by the locking releasing portion 300 in the direction of the arrow, the locker 241 pushes the main body 247 of the leaf spring 246 in the direction of an arrow. Then, the leaf spring 246 pivots on the one end thereof fixed to the lower case member 223 counterclockwise in FIG. 5. Therefore, since the second shutter engagement portion 248 is separated from the second locking slot 238, the second shutter 232 is freed from the restraint of the second locking slot 238.

That is, since the leaf spring 246 is also slid by the locker 241 at the same time as the locker 241 is slid by the locking releasing portion 300, the first shutter engagement portion 244 and the second shutter engagement portion 248 are substantially simultaneously separated from the first locking slot 237 and the second locking slot 238, respectively.

Figure 8:
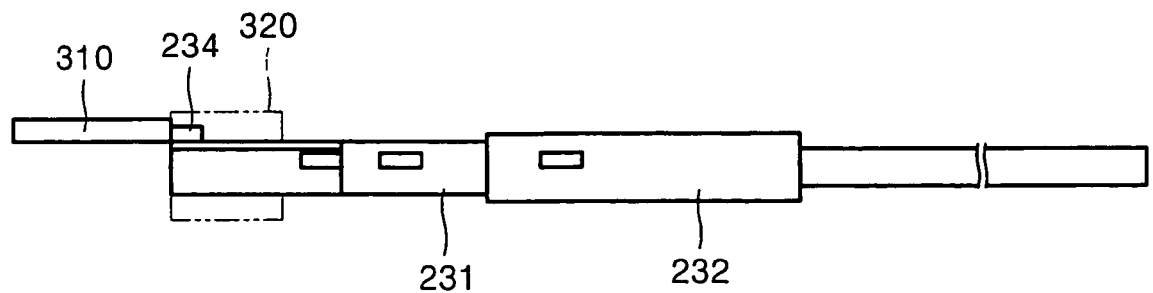
FIG. 8 is a side view of the disk cartridge for describing opening the operation of a first shutter shown in FIG. 1.

In this state, as shown in FIG. 8, when the disk cartridge 200 continues to be inserted into the disk drive, the projection 234 is stopped by a stopper member 310 installed at the disk drive from proceeding into the disk drive.

Since the disk cartridge 200 continues to be inserted into the disk drive, but the projection 234 is stopped by the stopper member 310 from moving into the disk drive, the first shutter 231 is relatively slid by the stopper member 310 in the direction opposite to the insertion direction of the disk cartridge into the disk drive.

Figure 9:
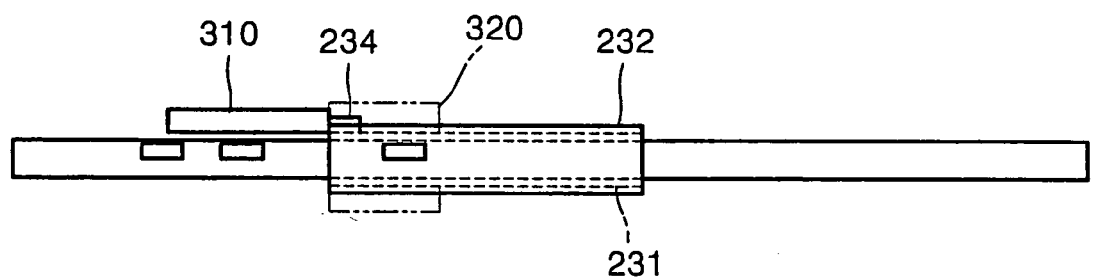
FIG. 9 is a side view of the disk cartridge for describing the opening operation of a first shutter and a second shutter shown in FIG. 2.

Referring to FIG. 9, when the first shutter 231 is slid by the stopper member 310 and the projection 234 is inserted into the insertion slot 235 (FIG. 3), the second shutter 232 is stopped by a hindrance portion 320 installed in the disk drive from moving into the disk drive. Therefore, the first shutter 231 and the second shutter 232 are relatively slid by the stopper member 310 and the hindrance portion 320 in the direction opposite to the insertion direction of the disk cartridge 200 into the disk drive.

Figure 10:
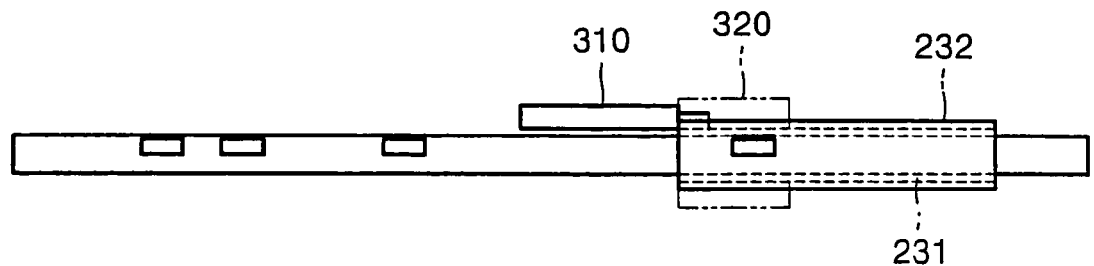
FIG. 10 is a side view of the disk cartridge illustrating a completely opened state of the first and second shutters shown in FIG. 2.

Referring to FIG. 10, since the first shutter 231 and the second shutter 232 are stopped by the stopper member 310 and the hindrance portion 320 from further moving into the disk drive, the opening portion 221 (FIG. 2) is exposed to the outside.

Figure 6:
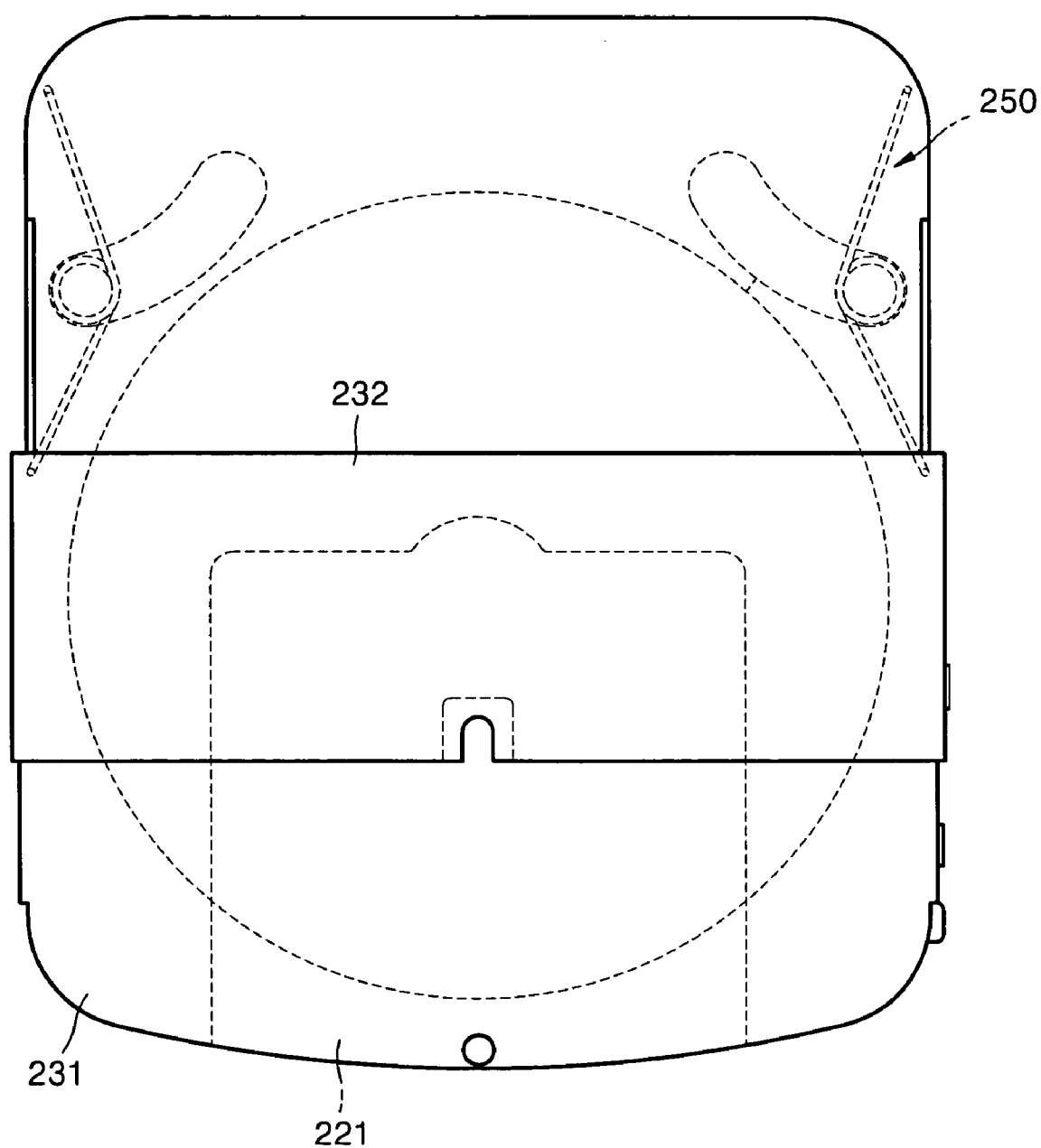
FIGS. 6 and 7 are plan views of the disk cartridge for describing the operation of an elastic member shown in FIG. 2.

When the first shutter 231 and the second shutter 232 cover the opening portion 221, the elastic members 250 are not compressed by the second shutter 232 as shown in FIG. 6.

Figure 7:
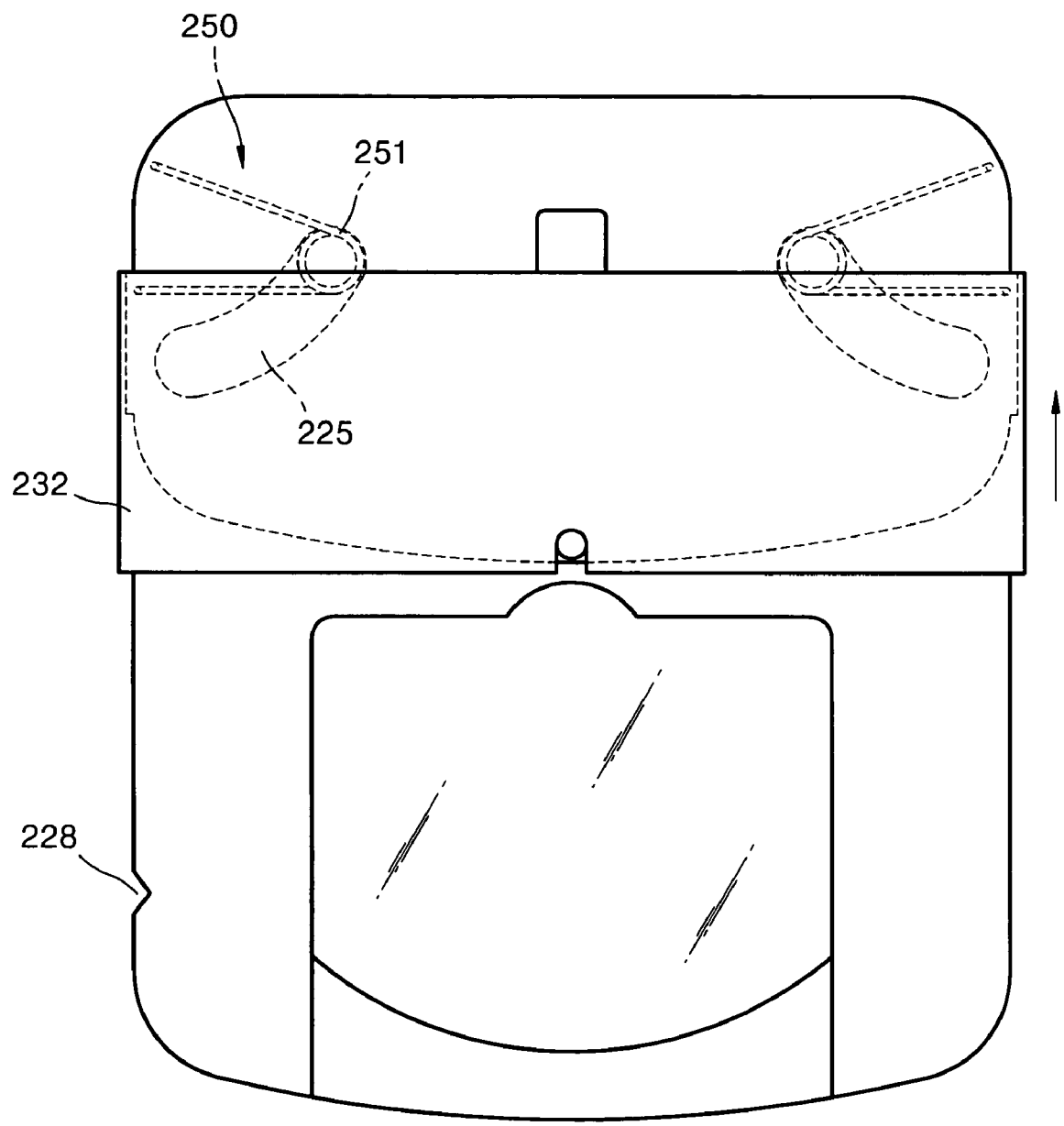

As shown in FIG. 7, as the second shutter 232 is slid and moved in the direction of an arrow, i.e., in the direction opposite to the insertion direction of the disk cartridge into the disk drive, the elastic members 250 are compressed by the second shutter 232, and therefore the bodies 251 are slid along the respective guide grooves 225.

When the disk cartridge 200 is completely inserted into the disk drive, the position fixing grooves 228 are joined and fixed to the position fixing projections.

The discharging operation of the disk cartridge 200 from the disk drive will now be described. When the disk cartridge 200 is pushed to the outside by the elastic force of the elastic members at the position fixing device in a state in which the disk cartridge 200 is inserted in the disk drive, the position fixing projections are separated from the position fixing grooves 228. At this time, while the second shutter 232 is restored to its original position by the elastic force of the elastic member, the disk cartridge 200 is discharged to some extent from the disk drive. Thereafter, when the user pulls the disk cartridge 200 out of the disk drive, the disk cartridge 200 is pulled out of the disk drive with the projection stopped by the stopper member 310, and, therefore, the first shutter 231 covers the opening portion 221.

When the disk cartridge 200 is completely pulled out of the disk drive, the first shutter engagement portion 244 engages with the first locking slot 237, the second shutter engagement portion 248 engages with the second locking slot 238. Therefore, the disk cartridge 200 assumes the state shown in FIG. 2.

Figure 11:
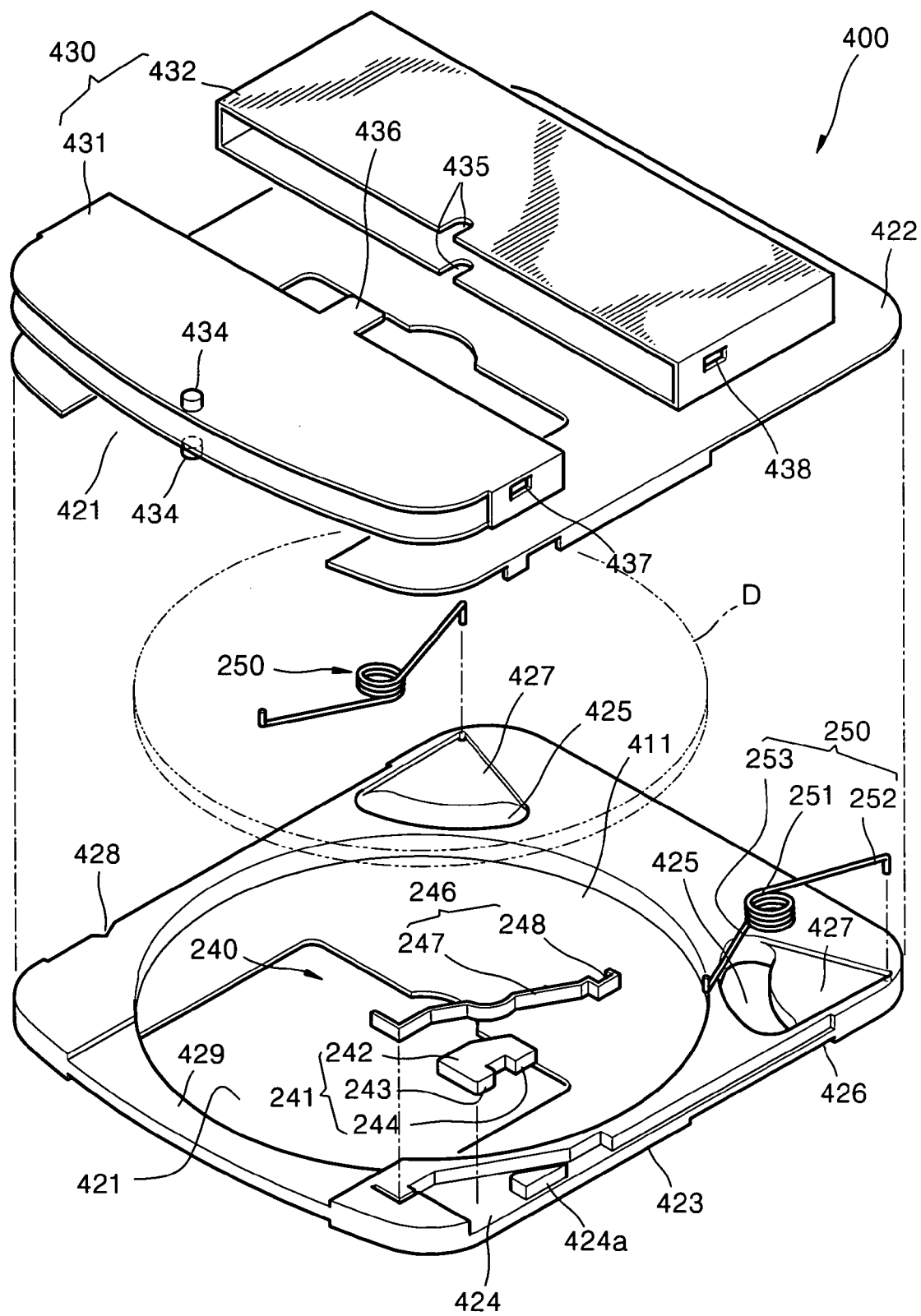
FIG. 11 is an exploded perspective view illustrating a disk cartridge according to a second preferred embodiment of the present invention.

FIG. 11 is an exploded perspective view illustrating a disk cartridge according to a second embodiment of the present invention. The same reference numerals denote similar members having similar operations of the previous drawings.

Referring to FIG. 11, a disk cartridge 400 according to another embodiment of the invention comprises an upper case member 422, a lower case member 423, a multiple-shutter member 430, a locking member 240, and elastic members 250.

A space portion 411 to receive an optical disk D of an information recording medium is formed at the middle portion of the lower case member 423, and an opening portion 421 is formed at the lower case member 423 so that a reading/recording device may obtain access to the optical disk D.

A locker cavity 424 in which the locking member 440 is installed is formed at one side of the lower case member 423. Access portions 429 which are formed to be depressions are provided at upper and lower surfaces of the front portion of the lower case member 423, that is, a side portion of the disk cartridge 400 which is a leading edge when the disk cartridge 400 is inserted into a disk drive so that a reading/recording device (not shown) may obtain access to the optical disk D.

A plurality of guide grooves 425, which guide the respective elastic members 450 so that the elastic members 450 slide when the disk cartridge 400 is inserted into or discharged from the disk drive, are formed at the rear portion of the lower case member 423. The guide grooves 425 will be described later together with the elastic members 450.

The upper case member 422 is joined to the lower case member 423 so as to envelop the optical disk D, and an opening portion 421 is formed at the upper case member 422 so that the reading/recording device may obtain access to the optical disk D.

In this second embodiment, since the optical disk D stores information on both surfaces thereof, and the reading/recording device needs to obtain access to the optical disk D through the lower case member 423, another opening portion 421 is formed at the lower case member 423.

The opening portion 421 is formed to be wide so that both a spindle motor (not shown) to rotate the optical disk D and the reading/recording device to read information stored in the optical disk D or to store information in the optical disk D may obtain access to the optical disk D.

The multiple-shutter member 430 is installed at the lower case member 423 to be able to slide while surrounding the upper case member 422 and the lower case member 423 so that the multiple-shutter member 430 selectively opens and closes the opening portions 421.

In addition, the multiple-shutter member 430 is composed of at least two shutters which overlap each other. When the shutters are referred to as a first shutter 431 and a second shutter 432 in sequence from a shutter installed at the front portion of the disk cartridge 400, that is, a side portion of the disk cartridge 400, which is a leading edge when the disk cartridge 400 is inserted into the disk drive, the multiple-shutter member 430 is configured so that the first shutter 431 may be inserted into the second shutter 432 and may overlap the second shutter 432. Therefore, the width of the first shutter 431 is smaller than that of the second shutter 432. As a matter of course, the multiple-shutter member 430 may be configured so that the second shutter 432 can be inserted into and overlap the first shutter 431.

Projections 434, to restrain movement of the first shutter 231, are symmetrically provided at the upper and lower surfaces of the first shutter 431. When the disk cartridge 400 is inserted into the disk drive, the projections 434 permit the first shutter 431 to move as much as the opening portions 421 can be exposed to the outside.

Insertion slots 435, which correspond to the projections 434 and into which the projections 434 are inserted, are formed at the upper and lower surfaces of the second shutter 432 so that the first shutter 431 has a more overlapped area with the second shutter 432. Therefore, when the first shutter 431 overlaps the second shutter 432, the projections 434 are inserted into the insertion slots 435.

In addition, shielding portions 436 are provided at the upper and lower surfaces of the rear portion of the first shutter 431, that is, a side facing the second shutter 432 so as to cover the insertion slots 435 and shield the optical disk D from foreign materials such as dust when the disk cartridge 400 is discharged from the disk drive.

Since the locking member 240 and the elastic members 250 are the same as those of the first embodiment, descriptions thereof are omitted.

Since the operation of the multiple-shutter member 430 according to the second embodiment is the same as that of the first embodiment, a description thereof is omitted.

As is described above, with the disk cartridge according to the present invention, the following effects can be obtained.

First, since a wide opening portion is formed at the disk cartridge, any type of reading/recording device can obtain access to the optical disk.

Second, when the disk cartridge is discharged from a disk drive, the disk cartridge prevents foreign materials such as dust from moving into the disk cartridge and contaminating the optical disk.

Third, since the multiple-shutter member is employed, the wide opening portion may be opened without making the size of the disk cartridge larger.

Fourth, since the multiple-shutter member slides and is opened in a direction opposite to the insertion direction of the disk cartridge into the disk drive, and is not positioned over the opening portion, the reading/recording device may be configured more freely, and, therefore, the disk drive may be compacted advantageously.

Fifth, since the front side of the disk cartridge is formed to have a rounded shape, and spaces in the disk drive, unnecessarily occupied by the disk cartridge may be reduced, parts and components of the disk drive may be disposed advantageously.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk cartridge comprising:
   a lower case member in which a space portion is formed to receive an optical disk;
   an upper case member, joined to the lower case member, including an opening portion to allow a reading/recording device to access the optical disk;
   a multi-shutter member, including shutters, installed at the lower case member to be able to slide, to allow the opening portion to be exposed to the outside when the multiple-shutter member is moved in a direction of the insertion direction of the disk cartridge into a disk drive, such that the shutters overlap each other; and
   a locking member, installed at the lower case member, to fix the multiple-shutter member to the lower case member so that the multiple-shutter member cannot move arbitrarily.

2. The disk cartridge according to claim 1, wherein the multiple-shutter member comprises:
   first and second shutters;
   a projection, to restrain movement of the first shutter, provided at a leading edge of the first shutter in the insertion direction of the disk cartridge into the disk drive; and
   an insertion slot, formed at the second shutter to be overlapped by the first shutter.

3. The disk cartridge according to claim 2, further comprising a shielding portion formed at the first shutter so as to cover the insertion slot and to prevent the optical disk from being contaminated by dust when the disk cartridge is discharged from the disk drive.

4. The disk cartridge according to claim 3, wherein the projection, the shielding portion, and the insertion slot are positioned in a straight line.

5. The disk cartridge according to claim 1, wherein the locking member comprises:

a locker including a push portion which is installed at a locker cavity formed at the lower case member to be able to slide, and to selectively contact with a locking releasing portion installed at the disk drive, and a first shutter engagement portion to be engaged with a first locking slot provided at the first shutter; and a leaf spring, which is installed so that a main body of the leaf spring contacts with the locker, one end of which is fixed to the lower case member, and which includes a second shutter engagement portion to be engaged with a second locking slot provided at the second shutter.

6. The disk cartridge according to claim 1, wherein the disk cartridge further comprises a plurality of elastic members installed at the lower case member so as to provide the multiple-shutter member with elastic force to restore the multiple-shutter member to an original position when the disk cartridge is discharged from the disk drive.

7. The disk cartridge according to claim 6, wherein, in each of the elastic members, one end of the elastic member is supported by the lower case member, and the other end of the elastic member is supported by the second shutter so that when the disk cartridge is inserted into the disk drive, a coil-shaped body of the elastic member may be slid along a guide groove formed at the lower case member while the elastic member is compressed by the second shutter.

8. The disk cartridge according to claim 7, wherein the disk cartridge further comprises movement guide portions formed as depressions at the lower case member so that movement of one of the ends of the elastic members may move smoothly.

9. The disk cartridge according to claim 1, wherein the disk cartridge further comprises an access portion formed as a depression at the lower case member.

10. The disk cartridge according to claim 1, wherein the leading edge side of the disk cartridge has a rounded shape.

11. A disk cartridge of a disk drive to allow an optical disk to accommodate both a slider carriage optical pickup and a swing arm optical pickup, comprising:
    a lower case member, including a space portion to receive the optical disk from an insertion direction;
    an upper case member, joined to the lower case member, including an open portion to allow optical access to the optical disk;
    first and second shutters slidably coupled to the lower case member to selectively allow the open portion to be exposed when one of the shutters is moved in a direction of the insertion direction of the disk cartridge into a disk drive such that the shutters overlap; and
    a locking member to fix the first and second shutters to the lower case member so that the first and second shutters cannot move arbitrarily.

12. The disk cartridge according to claim 11, further comprising:
    a projection to restrain movement of the first shutter at a leading edge of the first shutter in a movement direction; and
    an insertion slot at the second shutter into which the projection moves so as to allow the second shutter to be overlapped by the first shutter.

13. The disk cartridge according to claim 12, further comprising a shielding portion at the first shutter so as to cover the insertion slot and to prevent the optical disk from being contaminated by dust when the disk cartridge is discharged from the disk drive.

14. The disk cartridge according to claim 13, wherein the projection, the shielding portion, and the insertion slot are positioned in a straight line.

15. The disk cartridge according to claim 11, wherein the locking member comprises a locker, including a push portion installed at a locker cavity of the lower case member to slide, and to selectively contact with a locking releasing portion in the disk drive.

16. The disk cartridge according to claim 15, wherein the locking member further comprises a first shutter engagement portion to be engaged with a first locking slot in the first shutter.

17. The disk cartridge according to claim 16, wherein the locking member further comprises a leaf spring installed so that a main body of the leaf spring maintains contact with the locker, one end of which is fixed to the lower case member, and the other end of which includes a second shutter engagement portion to be engaged with a second locking slot in the second shutter.

18. The disk cartridge according to claim 11, wherein the disk cartridge further comprises a plurality of elastic members installed at the lower case member so as to provide the first and second shutters with elastic force to restore the first and second shutter to original positions when the disk cartridge is discharged from the disk drive.

19. The disk cartridge according to claim 18, wherein each of the elastic members comprises:
  ends, one end being supported by the lower case member, and the other end being supported by the second shutter; and
  a coil shaped body to provide a restoring force in the elastic member.

20. The disk drive according to claim 19, further comprising a guide groove at the lower case member, wherein when the disk cartridge is inserted into the disk drive, the coil shaped body of the elastic member may be slid along the guide groove while the elastic member is compressed by the second shutter.

21. The disk cartridge according to claim 19, wherein the disk cartridge further comprises movement guide portions formed as depressions at the lower case member to facilitate movement of one of the ends of the elastic members.

22. The disk cartridge according to claim 11, wherein the disk cartridge further comprises an access portion formed as a depression at the lower case member so that a device may access the optical disk.

23. The disk cartridge according to claim 11, wherein the leading edge side of the disk cartridge has a rounded shape.

* * * * *